United States Patent
Edwards et al.

(10) Patent No.: US 6,662,356 B1
(45) Date of Patent: Dec. 9, 2003

(54) APPLICATION PROGRAM INTERFACE FOR TRANSFORMING HETEROGENEOUS PROGRAMS

(75) Inventors: Andrew J. Edwards, Redmond, WA (US); Ken B. Pierce, Bellevue, WA (US); Amitabh Srivastava, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/343,276

(22) Filed: Jun. 30, 1999

(51) Int. Cl.[7] .............................. G06F 9/44; G06F 9/45; G06F 9/00
(52) U.S. Cl. ...................... 717/113; 717/146; 709/328
(58) Field of Search ................. 717/7, 1, 9, 5, 717/146, 100, 151, 136, 119, 149, 152–161, 104, 114, 106–113; 707/205, 3, 101–102, 103 R, 104.1, 10; 709/313, 315, 328

(56) References Cited

U.S. PATENT DOCUMENTS

| | | | | |
|---|---|---|---|---|
| 5,481,708 A | * | 1/1996 | Kukol | 717/155 |
| 5,559,884 A | | 9/1996 | Davidson et al. | 713/187 |
| 5,664,189 A | * | 9/1997 | Wilcox et al. | 707/205 |
| 5,664,191 A | | 9/1997 | Davidson et al. | 709/100 |
| 5,790,858 A | | 8/1998 | Vogel | 717/4 |
| 5,911,075 A | * | 6/1999 | Glaser et al. | 717/100 |
| 5,970,490 A | * | 10/1999 | Morgenstern | 707/10 |
| 6,061,515 A | * | 5/2000 | Chang et al. | 717/114 |
| 6,126,328 A | * | 10/2000 | Mallory et al. | 717/114 |
| 6,182,274 B1 | * | 1/2001 | Lau | 717/104 |
| 6,336,118 B1 | * | 1/2002 | Hammond | 707/101 |
| 6,370,681 B1 | * | 4/2002 | Dellarocas et al. | 717/100 |

OTHER PUBLICATIONS

Bradley–Millspaugh, Programming in Visual Basic 5.0, Nov. 3, 1997, Irwin McGraw–Hill, pp. 361–445.*
De Bosschere, K., et al., "Alto: A Link–Time Optimizer for the DEC Alpha.", *Technical Report TR–96–16*, (1996).
Goodwin, D.W., "Interprocedural Dataflow Analysis in an Executable Optimizer", *Proceedings of SIGPLAN '97 Conference on Programming Language Design and Implementation*, (1997).
Hastings, R., et al., "Purify: Fast Detection of Memory Leaks and Access Errors", *Proceedings of Winter Usenix Conference,*, (Jan. 1992).
Larus, J., et al., "Rewriting Executable Files to Measure Profeam Behavior", *Software Practice and Experience, 24* (2), 197–218, (1994).
Larus, J.R., "EEL: Machine–Independent Executable Editing", *ACM SIGPLAN Notices, 30*(6), pp. 291–300, (Jun. 1995).
Lee, H., et al., "A Tool for Instrumenting Java Bytecodes", *Proceedings of the 1997 USENIX Symposium pn Internet Technologies and Systems*, (1997).

(List continued on next page.)

Primary Examiner—Hoang-Vu Antony Nguyen-Ba
(74) Attorney, Agent, or Firm—Merchant & Gould P.C.

(57) ABSTRACT

An application program interface (API) into an hierarchical intermediate representation (IR) of a heterogeneous program enables the navigation and modification of the IR at all levels of the hierarchy. Additional functions provide information about the IR that can be employed by a user in understanding the logic flow of the program and by an output translator to convert the IR into blocks of platform-specific instructions for a new version of the heterogeneous program. The API functions are also utilized by pre-defined program tools to instrument and optimize the IR, and thus the heterogeneous program created from the IR.

32 Claims, 4 Drawing Sheets

OTHER PUBLICATIONS

Romer, T., et al., "Instrumentation and Optimization of Win32/Intel Executables Using Etch", *Proceedings of the USENIX Windows NT Workshop*, (1997).

Srivastava, A., et al., "A Practical System for Intermodule Code Optimization at Link Time", *Journal of Programming Language, 1* (*1*), 1–18, (1993).

Srivastava, A., et al., "ATOM, A System for Buidling Customized Program Analysis Tools", *ACM SIGPLAN Notices, 29* (*6*), pp. 196–205, (Jun. 1994).

Wall, D.W., "Systems of Late Code Modification, in Code Genetatio–Concepts, Tools Technique", *Robert Giegrich and Susan L. Graham, eds*, 275–293, (1992).

* cited by examiner

APPLICATION PROGRAM INTERFACE FOR TRANSFORMING HETEROGENEOUS PROGRAMS

RELATED APPLICATIONS

The present application is related to U.S. patent application Ser. No. 09/343,805 entitled "Translation and Transformation of Heterogeneous Programs", U.S. patent application Ser. No. 09/343,248 entitled "Instrumentation and Optimization Tools for Heterogeneous Programs", U.S. patent application Ser. No. 09/343,287 entitled "Cross Module Representation in Heterogeneous Programs", and U.S. patent application Ser. No. 09/343,279 entitled "Shared Library Optimization for Heterogeneous Programs", all of which being filed on the same day as the present application and assigned to the same assignee as the present application.

FIELD OF THE INVENTION

This invention relates generally to programming tools, and more particularly to translating code between computer architectures.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1998, Microsoft Corporation, All Rights Reserved.

BACKGROUND OF THE INVENTION

In a new programming paradigm, a program is now a collection of components. Each component publishes an interface without exposing its inner details. Thus, a component can internally exist in any form: Intel x86 binary, Intel IA-64 binary, Visual Basic (VB) byte codes, Java class files, or any Virtual Machine (VM) binary. A heterogeneous program consists of components in different forms. Heterogeneous programs already exist in some environments: in the Microsoft Windows 32-bit environment, a Visual Basic program is compiled into VB byte codes that can call native-compiled functions in a separate dynamic linked library. Similarly Java class files can call native functions. Intel's IA-64 architecture allows IA-64 code to co-exist with x86 code.

To understand the behavior of a heterogeneous program, all of its components, regardless of their form, have to be instrumented and analyzed in the same framework, otherwise, only partial information will be collected. It is important to note that systems that have been ported to several architectures are not sufficient to handle heterogeneous programs. For example, a system for VB byte codes that has been ported to x86 cannot provide a complete execution time analysis of a heterogeneous program consisting of VB byte codes and native x86 because each system operates in isolation on its own input.

Further, a heterogeneous program may consist of heterogeneous components. A heterogeneous component is a single component consisting of routines in different instruction sets. As the interface is well defined, components internally can use any instruction set. Each instruction set has its own advantages such as execution time, portability, and size.

All previous systems have been designed for homogeneous programs: conventional programs consisting of components in the same form. Some systems have been targeted to different architectures, but cannot work with heterogeneous programs. None of these systems can generate a heterogeneous component.

A large number of systems have been developed to help analyze and optimize homogeneous programs. The creation of "Pixie" by MIPS Computers Systems, Inc. in 1986 started a class of basic block counting tools by inserting predetermined sequence of instructions to record execution frequencies of basic blocks. "Epoxie" extended the technique by using relocations to eliminate dynamic translation overheads. David W. Wall. *Systems for late code modification*, in Code Generation—Concept, Tools Techniques, pp. 275–293, (Robert Giegrich and Susan L. Graham, eds, 1992). "QPT" further extended the technique by constructing spanning trees to reduce the number of basic blocks that are instrumented. James Larus and Thomas Ball, *Rewriting executable files to measure program behavior*, Software, Practice and Experience, vol. 24, no. 2, pp 197–218 (1994). "Purify" instruments memory references to detect out-of-bounds memory accesses and memory leaks. Reed Hastings and Bob Joyce, Purify: *Fast Detection of Memory Leaks and Access Errors*, Proceedings of Winter Usenix Conference, January 1992.

"OM" allowed general transformations to be applied to a binary by converting the binary to an intermediate representation that can be easily manipulated. Amitabh Srivastava and David Wall, *A Practical System for Intermodule Code Optimization at Link Time*, Journal of Programming Language, 1(1):1–18 (1993). OM has been implemented on MIPS, DEC Alpha and Intel x86 architectures. "EEL" uses a similar technique and provides an editing library for Sun SPARC architectures. James R. Larus and Eric Schnarr, EEL: *Machine-Independent Executable Editing*, Proceedings of SIGPLAN' 95 Conference on Programming Language Design and Implementation (1995). "Alto" and "Spike" are optimizers for the DEC Alpha architectures. K. De Bosschere and S. Debray, *Alto: a Link-Time Optimizer for the DEC Alpha*. Technical Report TR-96-16, Computer Science Department, University of Arizona (1996). David W. Goodwin, Interprocedural Dataflow Analysis in an Executable Optimizer, Proceedings of SIGPLAN' 97 Conference on Programming Language Design and Implementation (1997).

"ATOM" extended OM by providing a flexible instrumentation interface for the DEC Alpha and Intel x86 systems. Amitabh Srivastava and Alan Eustace, ATOM: *A System for Building Customized Program Analysis Tools*, Proceedings of SIGPLAN' 94 Conference on Programming Language Design and Implementation (1994). However, ATOM does not allow modifications to a binary. "Etch" provided a similar system for x86 and "BIT" for Java byte codes. T. Romer, G. Voelker, D. Lee, A. Wolman, W. Wong, H. Levy, B. Chen, and B. Bershad, *Instrumentation and Optimization of Win32/Intel Executables Using Etch*, Proceedings of the USENIX Windows NT Workshop (1997). Han Lee and Benjamin Zorn, BIT: *A Tool for instrumenting Java bytecodes*. Proceedings of the 1997 USENIX Symposium on Internet Technologies and Systems (1997).

None of these systems work on heterogeneous programs. Some of them have been ported to multiple architectures but they provide only a partial view when applied to heterogeneous programs as each implementation operates on its input in isolation. Although OM builds a symbolic representation, the representation is primarily designed for applying arbitrary transformations and is not sufficient to handle heterogeneous programs. None of these systems can generate heterogeneous components. ATOM provides a flexible interface for instrumentation only.

Therefore, there is a need to represent a heterogeneous program and its heterogeneous components in a fashion that permits a user to evaluate the behavior of the program to be evaluated across architectural boundaries and to optimize the entire program.

SUMMARY OF THE INVENTION

The above-mentioned shortcomings, disadvantages and problems are addressed by the present invention, which will be understood by reading and studying the following specification.

An application program interface (API) provides navigation, query, and modification functions to be performed on an intermediate representation (IR) of a heterogeneous program or component. The IR consists of platform-neutral instructions arranged in a hierarchy of elements common to all programming languages: code and data blocks, procedures, and components. The API is employed by an end user, pre-defined tools, and an output translator to add, delete, or modify the IR elements, to instrument the IR to gather statistics on its operation, to optimize the IR, and to output the IR into code for a specific architecture or architectures for execution. The basic navigation, query, and modification functions of the API are supplemented by specialized functions.

Because the API operates on the intermediate representation of the heterogeneous program or component, the caller of the API can examine and transform the code as a whole, crossing platform-specific boundaries, to achieve a more efficient program or component.

The present invention describes systems, methods, and computer-readable media of varying scope. In addition to the aspects and advantages of the present invention described in this summary, further aspects and advantages of the invention will become apparent by referencing the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, functions of an exemplary embodiment of the invention are described. Finally, in the fourth section, a conclusion of the detailed description is provided.

Hardware and Operating Environment

Figure 1:
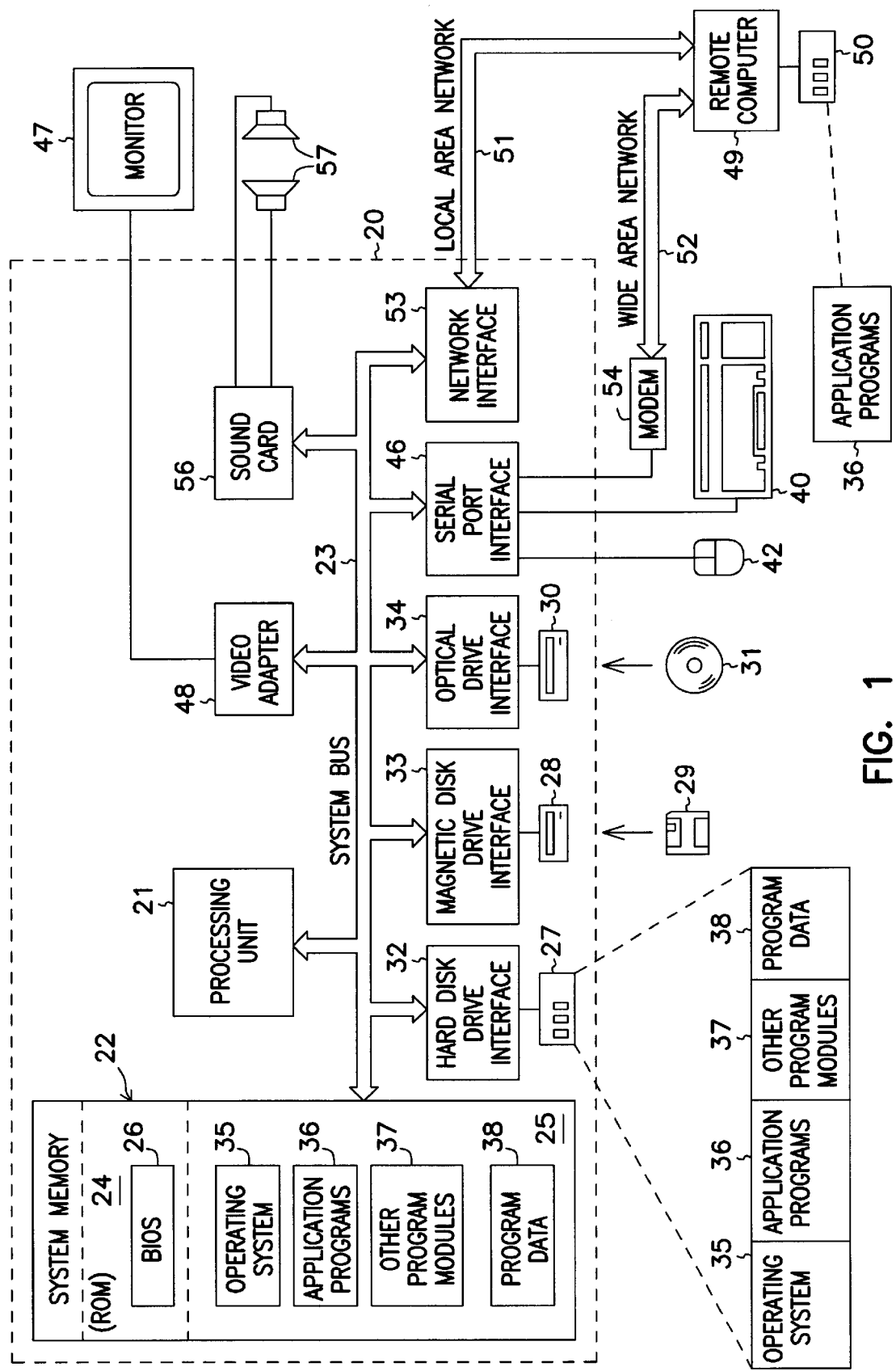
FIG. 1 is a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

Figure 2A:
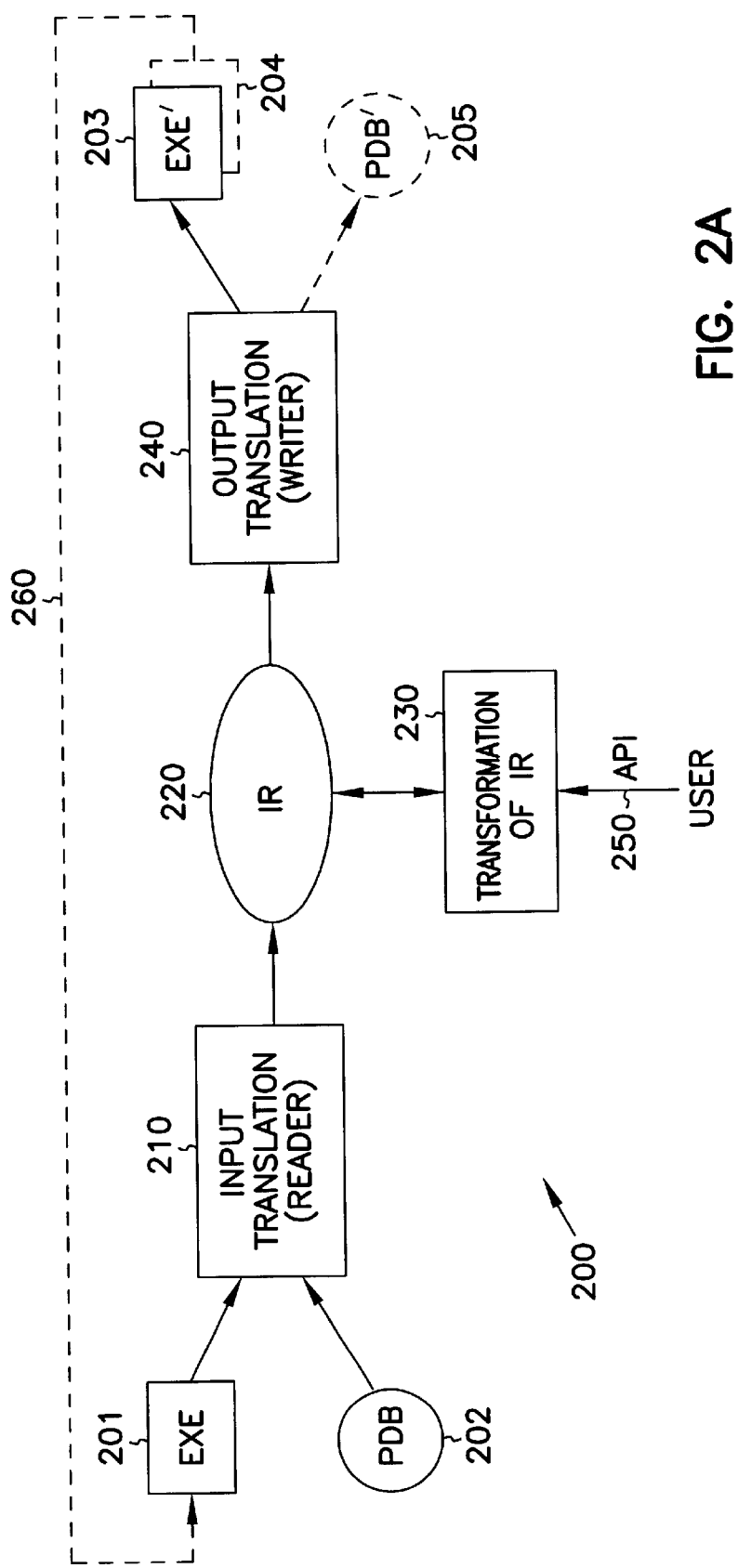
FIG. 2A is a diagram illustrating a system-level overview of an exemplary embodiment of the invention.

A system level overview of the operation of an exemplary embodiment of the invention is described by reference to FIGS. 2A–D. A heterogeneous program contains multiple executable components, such as main program code and shared libraries, written for different computer architectures (platforms) or programming languages. FIG. 2A shows a system 200 that translates and transforms components in a heterogeneous program. The system 200 comprises an input translator (reader) 210, a transformation module 230, and an output translator (writer) 240. All three modules work with a high-level abstraction of a heterogeneous program, referred to as an "intermediate representation" (IR) 220. The IR is a set of pseudo-instructions for a stack-based logical machine with an unlimited number of registers that represent the functionality of the heterogeneous program.

Figure 2B:
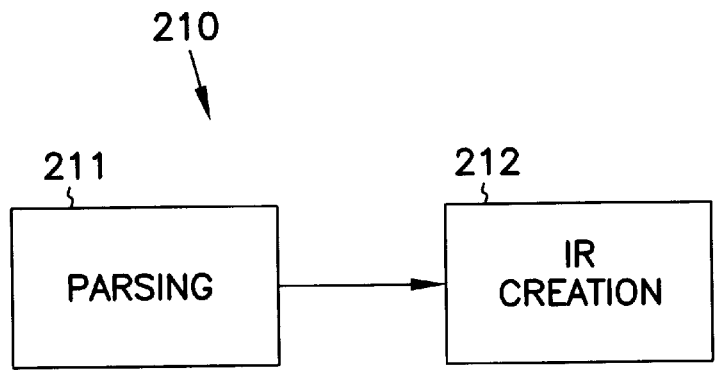
FIGS. 2B, 2C and 2D are diagrams illustrating additional details of the processes shown in FIG. 2A.
Figure 2C:
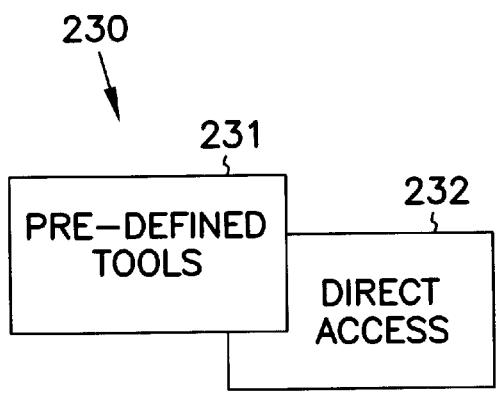

The reader 210 creates an IR 220 from an executable component (EXE) 201. The reader 210 is a two-stage process as shown in FIG. 2B. First, the executable 201 is parsed 211 into its basic blocks of code and data using information provided in a program database file (PDB) 202. As well-known in the art, a basic code block is defined as a code block having a single entry point and a single exit point. In an alternate embodiment, all the work performed by the parser 211 is input directly into the second stage of the reader 210, thus skipping the parsing process.

Once the code and data blocks are identified, an IR creation process 212 evaluates each platform-dependent instruction on a block-by-block basis. There are very large set of common instructions regardless of architecture, i.e., move, store, add, etc., that can be represented by a single platform-neutral IR instruction. For RISC (reduced instruction set computer) architectures, most, if not all, instructions can be easily translated into a single platform-neutral IR instruction. On the other hand, CISC (complex instruction set computer) architectures, such as the Intel x86 family, contain complex instructions that provide the function of multiple instructions. In one exemplary embodiment, the platform-dependent instructions that have a single platform-neutral IR instruction counterpart are translated into that platform-neutral instruction, while complex instructions are replicated as-is within the IR through an extended version of the basic IR instruction. A replicated complex instruction is marked with a signature that denotes its architecture. The output translator 240 recognizes a signed complex instruction and processes it as described further below. In an alternate embodiment, a complex instruction is represented by a set of platform-neutral IR instructions that perform the equivalent function.

Figure 3:
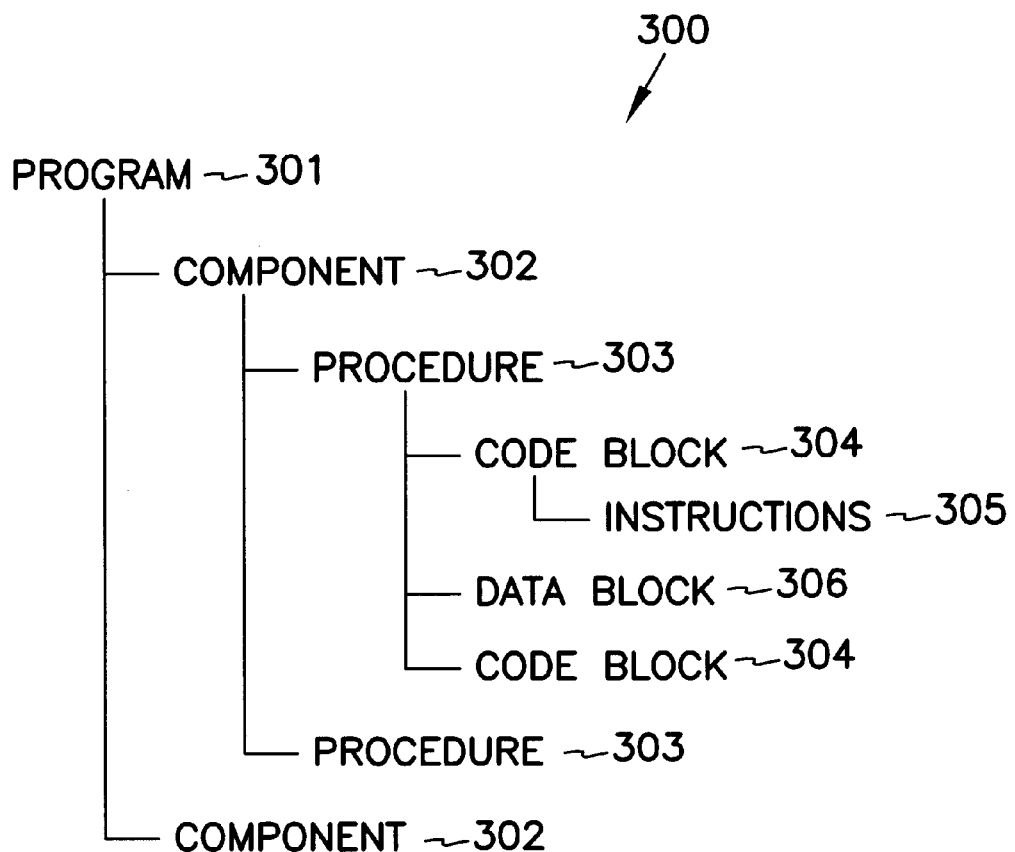
FIG. 3 is a diagram of an intermediate representation hierarchy used by the exemplary embodiment of FIG. 2A.

After the instructions in the code blocks have been translated, the IR creation process 212 creates a logical hierarchical view of the executable 201 as illustrated in FIG. 3. All architectures share the basic concepts of instructions 305, code blocks 304, data blocks 306, components 302, and procedures 303, so the IR hierarchy 300 enables the user to understand the structure of the intermediate representation of a heterogeneous program 301. The code blocks are logically connected as specified in the EXE file 201 so that the blocks can be more easily manipulated during the transformation process 230. Procedures are determined by following the logical connections using information provided in the PDB file 202. Procedures are collected together to create the program components. Little or no optimization of the program is performed by the creation process 212 since it is desirable that the intermediate representation be as close to what the programmer originally wrote as possible.

However, tracing the logical connections to determine the procedures can result in more procedures being created than originally coded by the programmer. Therefore, the creation process 212 annotates, or "decorates," the hierarchy 300 with the user names supplied in the symbol table for the EXE 201. The annotations enable the user to understand how the IR control flows and how the elements of the IR hierarchy correspond to the procedures and the components in the original code so the appropriate transformations can be applied to the IR. The annotations are maintained in data structures for the procedures during the transformation process and output by the output translator 240.

At the end of the creation of the IR hierarchy, all instructions are represented in the hierarchy as IR instructions within code blocks so that there is no differentiation between code written for one platform and code written for a second platform. The creation of the IR and an exemplary embodiment of the IR hierarchy are described in detail in the related "Translation and Transformation" patent application.

Once the intermediate representation is complete, the user is allowed to manipulate the code and data (illustrated by the IR transformation module 230) through an application program interface (API) 250. The exemplary embodiment of the system 200 provides some pre-defined tools 231 (FIG. 2C) used to instrument and optimize the IR that are guaranteed to be safe in that the tools will evaluate a change requested by the user and only manipulate the code in an appropriate manner. The API 250 also permits the user direct access 232 to the IR to navigate through the IR and to make changes, such as moving blocks between procedures, modifying blocks, rearranging the logical connections between blocks, and changing the platform-specific instruction set for a code block. The tools 231 are described in detail in the related "Instrumentation and Optimization Tool" patent application. The API 250 is described in the next section.

By instrumenting the IR using the tools 231, the user can now watch the interrelationship between the various components of a heterogeneous program and determine if a block of code contained in one component is heavily used by another component, and therefore that block of code should be moved out of the first component and placed into the second component to speed up execution. This process is described in detail in the related "Shared Library Optimization" patent application. Alternately, the user may decide to copy, instead of move, the code into the second component, a process referred to in the art as "code replication." A common optimization technique called "inlining" utilizes code replication.

Figure 2D:
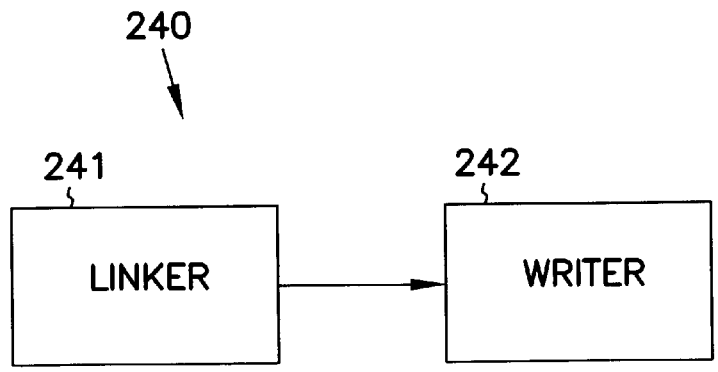

The transformed IR is now input into the output translator 240. The output translator 240 operates on the IR in two phases as shown in FIG. 2D: a linker phase 241 that resolves the logical connections into absolute addresses in an address space for a modified version of the executable, and a writer phase 242 that assembles the IR into the modified version of the executable (EXE') 203. The blocks in the executable 203 can be emitted by the writer 242 for their original platform, or can be emitted for a different platform.

The linker 241 must maintain the semantics of the code of the hierarchy when resolving the addresses, i.e., preserve the logical connections between blocks and the location of referenced data. The linker 241 determines the size of each code block based on the length of each instruction in the block. The linker 241 is also responsible for adding whenever prologue and epilogue code necessary to "glue" together contiguous blocks that will be assembled into different platform-dependent instructions. As part of the address resolution, the linker 241 also can perform limited code modification or optimization. For example, assume that prior to the transformation process 230, there was a jump between two code blocks, but those blocks are now contiguous. In this case, the linker 241 removes the now-unnecessary jump and lets the logic flow fall through to the second block. Because the hierarchy extends down to the instruction level and is consistent regardless of the manipulation performed by the user, the linker 241 has more knowledge of the placement of instructions than did the programmer. Thus, in architectures in which instructions have both a long and short form depending on the location they are addressing, the linker 241 chooses the appropriate instruction size, which can be a better choice than that originally made by the programmer.

The writer 242 assembles each IR instruction into its platform-dependent counterpart based on the architecture specified in the code block. In an exemplary embodiment in which complex instructions are replaced in the IR, if the complex instruction is being written to the same platform, the writer 242 merely emits the instruction. If the complex instruction is designated to be translated into a different architecture, the writer 242 creates the appropriate set of platform-specific instructions to perform the same function as the original, complex instruction.

As part of the EXE' 203, the writer 242 creates an emitted block information data structure containing the annotations created by the reader process 210 for each block in the executable. This allows the EXE' 203 to be iterated through the entire process 200 as many times as desired (represented by phantom arrow 260 and described in the related "Translation and Transformation" patent application), while enabling the user to distinguish the original procedures from those added in a previous iteration. In an alternate embodiment, the emitted block information is combined with the PDB file 202 to create a new version of the program database file (PDB') 205 (shown in phantom). The output translation process 240 is described in detail in the related "Cross Module Representation" patent application.

In an alternate exemplary embodiment of the translation and transformation system 200 not illustrated, the IR containing the absolute addresses assigned by the linker 241 is used as input into the IR creation process 212 for further iteration through the system 200. One of skill in the art will immediately appreciate that much of the work performed by the creation process 212 as described above can be skipped when iterating the modified IR through the system 200. This embodiment allows the user to transform a heterogeneous program in stages rather than having to make all the changes in a single pass through the system 200. The system level overview of the operation of an exemplary embodiment of the invention has been described in this section of the detailed description. A translation and transformation system translates a binary component into an intermediate representation, provides an application program interface through which a user can transform the intermediate representation, and translates the intermediate representation as transformed by the user into a modified version of the binary. While the invention is not limited to any particular arrangement of modules, for sake of clarity exemplary set of modules has been described. One of skill in the art will readily recognize that the functions attributed to the modules described in this section can be assigned to different modules without exceeding the scope of the invention. Furthermore, although the translation and transformation of only one input component (EXE 201) has been illustrated and described above, the system can take multiple components, and accompanying PDB files, as input.

Functions of Exemplary Embodiments of the Invention

In the previous section, a system level overview of the operations of exemplary embodiments of the invention was described. In this section, the particular functions provided by such exemplary embodiments of the application program interface (API) 250 are described. The API 250 and the functions it provides are described in object-oriented programming terms, but one of skill in the art will immediately perceive that the invention is not so limited.

The API 250 provides an interface to the IR for pre-defined tools 231, direct access 232 by a user, and for the output translator (writer) 240. Each element class (type) present in the IR hierarchy 300 exports an API. Additional API calls are provided for specialized uses, such as inserting probe code for instrumentation purposes as described in the related "Instrumentation and Optimization" patent application. The APIs for the individual element class and the specialized API combine to make up the API 250. For ease in description, similar functions provided by the present embodiment of the API 250 are categorized and described together below in conjunction with a series of tables. Table 1 contains navigation functions, Table 2 contains query functions, Table 3 contains modification functions, Table 4 contains instrumentation functions, Table 5 contains output translation functions, and Table 6 contains miscellaneous functions. The tables consist of the API calls, the elements that expose each call, the function provided by the call, and a remarks section. Except where noted, the API calls that do not specify arguments perform their function relative to the most recently returned ("current") element of the appropriate element class. One of skill in the art will readily recognize that the categories below are not rigid and that various API calls provide functions that fit into more than one category.

Navigation

Each element class in the IR hierarchy 300 exposes navigation functions that enable movement though the elements in the hierarchy using "first," "last," "next," and "previous" functions. Such functions form an "iterator" for the element class. Thus, the component iterator allows a user to move from component to component in the IR for a program, while the procedure iterator allows a user to move from procedure to procedure in the IR for a component. The program, component, procedure, and block APIs further provide a navigation function that returns its first or last child element, i.e., the component API enables a user to find the first or last code or data procedure in the component. The APIs for the component, procedure, block, and instruction element classes also provide a navigation function that returns its parent element, i.e., the procedure API returns the component element in which it is a procedure element.

The iterators for the hierarchical elements are also employed by the output translator 240 when translating the IR into platform-specific instructions as described in the related "Cross Module Representation" patent application.

The navigation functions of the API 250 are shown in Table 1 below.

TABLE 1

| IR Element | API Call | Function | Remarks |
| --- | --- | --- | --- |
| Component, Procedure, Block, Instruction | First( ); Last( ); Next( ); Prev( ) | returns first/last/previous/next element relative to current element of class (code procedures and blocks) | retrieved element becomes current element of class |
| Program | FirstComp( ); LastComp( ) | returns first/last component in program | create iterator for components |
| Component | FirstProc( ); LastProc( ) | returns first/last code procedure in current component | create iterator for procedures |
|  | FirstAllProc( ); LastAllProc( ) | returns first/last procedure (code or data) in current component | create iterator for procedures |
|  | ParentProg( ) | returns parent program | will return NULL if no program binary open |
| Procedure | FirstAll( ); LastAll( ); NextAll( ); PrevAll( ) | returns first/last/next/previous procedure (code or data) relative to current procedure in current component | retrieved procedure becomes current procedure |
|  | FirstBlock( ); LastBlock( ) | gets first/last code block in current procedure | create iterator for blocks |
|  | FirstAllBlock( ); LastAllBlock( ) | gets first/last block (code or data) in current procedure | create iterator for blocks; includes unreachable blocks |
|  | ParentComp( ) | returns parent component |  |
| Block | FirstAll( ); LastAll( ); NextAll( ); PrevAll( ) | returns first/last/next/previous block (code or data) relative to current block | retrieved block becomes current block |
|  | FirstInst( ); LastInst( ) | returns first/last instruction in current block | creates iterator for instructions |
|  | ParentProc( ) | returns parent procedure |  |
| Instruction | ParentBlock( ) | returns parent block for current instruction |  |

Query

Each IR hierarchy element class exposes query functions that return information about the current element of its class. Additional functions necessary to understand the structure of the IR, such as entry points, number of child elements, imports and exports, and targets for calls and jumps, are also provided in the appropriate APIs. The query functions are used by the pre-defined tools 231 to determine the appropriate places to place instrumentation probes and opportunities to optimize the code as described in the related "Instrumentation and Optimization" patent application, by the user when directly accessing the IR (direct access 232), and by the output translator 240 when creating the platform-specific output as described in the related "Cross Module Representation" patent application. The query functions of API 250 are shown in Table 2 below.

TABLE 2

| IR Element | API Call | Function | Remarks |
| --- | --- | --- | --- |
| All | GetUserData( ) | returns user data | |
| Program, Procedure | Name( ) | returns name of element | |
| Component, Procedure, Block, Instruction | DbgPrint( ) | returns debugging information | |
| Component, Procedure | FirstExport( ) | returns first export for current element | creates an iterator for exports |
| Procedure, Block, Instruction | FirstScr(component) | returns entry point into source information for current element | creates iterator for source information |
| Block, Instruction | BlockTarget( ) | returns target block of current element | call, jump, conditional jump |
| | ProcTarget( ) | returns target procedure of current element | call |
| | ImportTarget( ) | returns target import of current element | indirect call |
| Program | CountComps( ) | returns number of components in program | |
| Component | CountProcs( ) | returns number of code procedures in current component | |
| | CountAllProcs( ) | returns number of all (code or data) procedures | |
| | InputType( ); OutputType( ) | returns type of input/output component | architecture instruction set |
| | InputName( ) | returns name of input component | |
| | EntryProc( ) | returns primary entry point for current component | |
| | BlockFromSymName(name) | returns code block corresponding to symbol name | |
| | FirstImport( ) | returns first import for current component | |
| | CountImports( ) | counts imports for current component | |
| | FindImport(binary, name/ordinal) | returns import corresponding to name or number in external binary | |
| | CountExports( ) | counts exports for current component | |
| | TimeStamp( ) | returns timestamp for current component | |
| | FindExport (name/ordinal) | returns export corresponding to name or number in current component | |
| Procedure | CountBlocks( ) | count code blocks in current procedure | |
| | CountAllBlocks( ) | count code and data blocks in current procedure | includes unreachable blocks |
| Block | CountInsts( ) | count instructions in current block | |
| | SymName(buffer, offset) | returns symbol name at offset within current block | |
| | AlignmentSize( ) | returns block alignment | |
| | BlockId( ) | returns block identifier | |
| | FirstReloc( ) | returns entry point into relocation information | creates iterator for relocation information; NULL if code block |
| | BlockFollower( ) | returns follower block | |
| Instruction | OpCode( ) | return opcode for current instruction | |
| | OpcodeStr( ) | returns string representation of current instruction | |
| | OpcodeGrp( ) | returns opcode group for current instruction | |
| | OpcodeGroupStr( ) | returns string representation of opcode group for current instruction | |

TABLE 2-continued

| IR Element | API Call | Function | Remarks |
|---|---|---|---|
| | OpSize( ) | returns size of primary operand for current instruction | 0 (NOP), 8 (MOVB), 16, 32, 64, etc. |
| | OperandStr( ) | returns operand for current instruction as a string | |
| | Operand( ) | returns operands for current instruction | |

Modification

Each IR hierarchy element class exposes modification functions that enable the IR to be changed at all levels. These functions are primarily used by the transformation module 230. The modification functions of the API 250 are shown in Table 3 below.

TABLE 3

| IR Element | API Call | Function | Remarks |
|---|---|---|---|
| All | Destroy( ) | deletes element from main memory | must restart navigation with different iterator |
| | SetUserData(data) | sets user data | |
| Component, Procedure, Block Instructions | Remove( ) | removes current element from parent element | |
| | InsertPrev(element); InsertNext (element) | inserts new element before/after current element | within same class |
| Block, Instruction | SetBlockTarget(block) | sets target block of current element | call or jump, otherwise NULL |
| | SetProcTarget(procedure) | sets target procedure of current element | call |
| | SetImportTarget(import) | sets target import of current element | indirect call |
| Program | InsertFirstComp(component); InsertLastComp(component) | inserts new component before first or after last component in program | |
| Component | InsertFirstProc(procedure); InsertLastProc(procedure) | inserts new procedure before first or after last procedure in component | |
| | SetEntryPoint(procedure) | sets primary entry point for current component | |
| | NewProc(name) | create new, empty procedure in current component | inserted at beginning of component |
| | CreateImport(binary, function) | adds an import into current component | returns code block used as call target for new import |
| | MergeIR(binary) | merges current component with binary | can also specify a termination routine when necessary |
| | RedirectProc (binary-from, name-from, binary-to, name-to) | redirects an import/external procedure | |
| | TimeStamp( ) | sets timestamp for current component | |
| Procedure | SetName(name) | sets IR name | |
| | Create(component, name) | creates new procedure | not inserted automatically; name becomes symbol in component |
| | InsertFirstBlock(block); InsertLastBlock(block) | inserts new block before first block or after last block in current procedure | |
| | Reverse( ) | reverses order of blocks in current procedure | |
| Block | InsertFirstInst(instruction); InsertLastInst(instruction) | inserts new instruction before first or after last instruction | |
| | CreateCodeBlock( ) | creates new code block | not inserted automatically in procedure |
| | CreateDataBlock(data, size) | creates new data block | not inserted automatically in procedure |
| | SetAlignmentSize( ) | sets block alignment | |
| | SetData(data, size) | fills data block | |
| | SetBlockId(identifier) | sets block identifier | |
| | SetBlockFollower(block) | sets block as follower block | |
| | SetPlatformT(platform) | specifies platform for emitted instructions | |

TABLE 3-continued

| IR Element | API Call | Function | Remarks |
| --- | --- | --- | --- |
| Instruction | InsertNext(instruction); InsertPrev(instruction) | inserts new instruction before/after current instruction | |
| | Create( ) | creates empty instruction | not inserted automatically into block |
| | Create(opcode, arguments) | creates an instruction | instruction type is determined by arguments |
| | Create(instruction) | copies an instruction | |
| | SetOpcode(opcode) | sets opcode of current instruction | |
| | SetOperand(operand) | sets operand of current instruction | |

Instrumentation

The instrumentation functions of the API 250 shown in Table 4 are used by the pre-defined tools 231 and the user direct access 232 provided by the transformation module 230. Because the component, procedure, block, and instruction classes expose instrumentation functions, "probe" code can be inserted at any level in the IR hierarchy as specified by the caller of the API 250 so statistics can be acquired at any point in the IR. The commit and revert calls permit the caller to determine when and if the instrumentation changes requested by the caller should be made to the IR.

TABLE 4

| IR Element | API Call | Function | Remarks |
| --- | --- | --- | --- |
| Global | CreateProto(component, binary, name) | creates external code to be called from the IR | |
| | CreateSaveData(name, definition) | creates storage to save data | |
| | Commit( ) | commits changes made to IR | |
| | Revert( ) | reverts changes made to IR | |
| Component, Procedure, Block, Instruction | AddCall(element, location) | inserts a call to external code before/after element | |
| | AddSaveData(element, location) | saves data state before/after element | |
| Procedure | CreateExchangeProc(component, binary, function name) | creates new procedure to exchange for existing one | |
| | Exchange(procedure) | exchange new procedure for current procedure | returns entry block for original procedure |

Output Translation

As described in the related "Cross Module Representation" patent application, the output translator 240 emits platform-specific instructions based on the contents of the IR. The output translator 240 relies on flags created by the input translation module 210 (described in the related "Translation and Transformation" patent application) to determine the type of processing to be performed on the elements of the IR. Additional flags used by the output translator 240 are arguments input into the input translator 210 as indicated below. Both the linker 241 and writer 242 modules of the output translator 240 access the IR using the API calls shown below in Table 5.

TABLE 5

| IR Element | API Call | Function | Remarks |
| --- | --- | --- | --- |
| Procedure, Block, Instruction | Size( ) | returns size of element | |
| | Print(file name) | outputs IR instruction(s) | |
| | PrintAsm(file name) | outputs disassembled platform-specific instruction(s) | |
| | Addr( ) | returns address of element | |

TABLE 5-continued

| IR Element | API Call | Function | Remarks |
|---|---|---|---|
| Procedure, Block | Raw( ) | returns bytes of element | |
| Block, Instruction | IsInserted( ) | is element part of original binary | boolean |
| Component | CanWritePdb( ) | is program data base (PDB) file to be created | boolean; input at IR creation time |
| | IsRereadable( ) | can IR be iterated | boolean; see Write API call |
| | AssignAddresses( ) | compute new addresses | as described in related patent application |
| | Write(output file name, pdb file name, map file name, IsRereadable) | writes platform-specific component into output file, and related information into PDB file and map file | as described in related patent application |
| Procedure | IsExported(component) | is current procedure exported | boolean |
| | IsNoReturn( ) | does current procedure end in a return | boolean |
| | HasExcept( ) | does current procedure register an exception | boolean |
| | SymName(buffer, component) | store symbolic name of current procedure | |
| Block | Returns( ) | does block end with return | boolean |
| | IsDataBlock( ) | code or data block | boolean |
| | HasCall( ) | does block end with call | boolean |
| | HasCBranch( ) | does block end with a conditional branch | boolean |
| | IsUnreachable( ) | is block unreachable | boolean |
| | IsObsolete( ) | is block to be deleted from output binary | boolean |
| | IsCallTarget( ) | is block a call target | boolean; direct calls only |
| | IsAddrTakenGlobal( ) | is block an inter-procedure address reference | boolean |
| | IsAddrTakenLocal( ) | is block a jump table branch target | boolean; intra-procedure address reference |
| | IsEntryBlock( ) | is block a possible entry point for procedure | boolean; either a call target or an inter-procedure address reference |
| | IsInstrumentatble( ) | can new code be inserted into block | boolean |
| | BlockTerminationType( ) | returns termination type of block | |
| | OrigAddr(component) | returns compiler-emitted address of current block | |
| | Emit(buffer) | assemble current block in buffer to determine size | |
| Instruction | IsData( ) | does instruction represent data | boolean |
| | IsValid( ) | can instructions be emitted as platform-specific instruction | boolean |
| | ReadsMemory( ) | does instruction read from main memory | boolean |
| | WritesMemory( ) | does instruction write to main memory | boolean |
| | StackMemory( ) | does instruction reference an offset in the stack | boolean |
| | RegsDef(bit map) | returns registers defined by instruction | |
| | RegsUse(bit map) | returns registers used by current instruction | |

Miscellaneous

The API 250 requires that pre-defined tools use the API functions shown in Table 6 to initiate access to the IR.

TABLE 6

| IR Element | API Call | Function | Remarks |
|---|---|---|---|
| Program, Component | Open(file name) | opens binary for element | open program will open all components |

TABLE 6-continued

| IR Element | API Call | Function | Remarks |
| --- | --- | --- | --- |
| Component | Build( ) | builds IR | if not previously created |
| | UseBlockFollowers( ) | marks appropriate blocks as fall-through | |

In this section, the particular functions performed by computer in executing an exemplary embodiment of an API 250 to transform and translate an IR for a program, component, or set of components has been described with reference to Tables 1–6. One of skill in the art will immediate appreciate that functions that perform similar actions can be substituted for the functions specified above without departing from the scope of the invention.

Conclusion

An application program interface (API) into an hierarchical intermediate representation (IR) of a heterogeneous program has been described that enables the navigation and modification of the IR at all levels of the hierarchy. Furthermore, other functions provided by the API return information about the IR that can be employed by a user in understanding the logic flow of the program and by an output translator to convert the IR into blocks of platform-specific instructions for a new version of the heterogeneous program. The API functions are also utilized by pre-defined program tools to instrument and optimize the IR, and thus the heterogeneous program created from the IR.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate the functions shown in Tables 1–6 are not required to be implemented in an object-oriented language such as C++, but are adaptable to other programming paradigms. The terminology used in this application with respect to is meant to include all architectural environments that support the basic programming constructs embodied in the IR hierarchy. Therefore, it is manifestly intended that this invention be limited only by the following claims and equivalents thereof.

We claim:

1. An application program interface embodied on a computer-readable medium for execution on a computer in conjunction with an intermediate representation of a heterogeneous program, the application program interface comprising:

a navigation function that returns an element in the intermediate representation to a caller of the application program interface;

a query function that returns information about the element in the intermediate representation returned by the navigation function to the caller; and a modification function that modifies the element in the intermediate representation as directed by the caller, wherein the intermediate representation comprises a plurality of platform-neutral elements, wherein the plurality of platform-neutral elements comprise (a) one or more platform-neutral elements derived from a first code written for a first computer architecture, and (b) one or more platform-neutral elements derived from a second code written for a second computer architecture, wherein the first computer architecture is different from the second computer architecture.

2. The application program interface of claim 1, wherein the element returned by the navigation function is designated the current element of its type and the navigation function operates relative to the current element of a type specified by the caller.

3. The application program interface of claim 1, wherein the navigation function comprises:

a next function that returns the element of a specified type that is next in order within the hierarchy of the intermediate representation;

a previous function that returns the element of a specified type that is previous in order within the hierarchy of the intermediate representation;

a first function that returns the element of a specified type that is first in order within the hierarchy of the intermediate representation; and a last function that returns the element of a specified type that is last in order within the hierarchy of the intermediate representation.

4. The application program interface of claim 3, wherein the order within the hierarchy is relative to an element that is one level above the returned element in the hierarchy.

5. The application program interface of claim 3, wherein the navigation function comprises:

a parent function that returns an element that is one level above an element of a specified type in the hierarchy.

6. The application program interface of claim 1, wherein the query function comprises:

a counting function that enumerates a specified characteristic of the element returned by the navigation function; and a control flow function that returns information relating to logical connections between the element returned by the navigation function and other elements in the intermediate representation.

7. The application program interface of claim 6, further comprising:

an instruction function that returns information on instruction structure when the element returned by the navigation function is an instruction in the intermediate representation.

8. The application program interface of claim 1, wherein the modification function comprises:

a creation function that creates a new element of a specified type;

an insertion function that inserts an element of a specified type into the intermediate representation;

a deletion function that deletes an element of a specified type from the intermediate representation; and a control flow function that logically links an element of a specified type to another element in the intermediate representation.

9. The application program interface of claim 1, further comprising:
an output translation function that translates the element returned by the navigation function into a corresponding element for a specific computer architecture and returns the corresponding element to the caller.

10. The application program interface of claim 9, wherein the output translation function determines the specific computer architecture based on a flag set by the caller.

11. The application program interface of claim 9, wherein the output translation function writes the corresponding element to an output file.

12. The application program interface of claim 1, further comprising:
an instrumentation function that inserts probe code specified by the caller into the intermediate representation at a location relative to the element returned by the navigation function.

13. The application program interface of claim 12, wherein the probe code includes a call to an external component provided by the caller.

14. A computerized system comprising:
a processing unit;
a system memory coupled to the processing unit through a system bus;
a computer-readable medium coupled to the processing unit through a system bus;
an intermediate representation for a heterogeneous program in the system memory;
a transformation process executing in the processing unit; and
an application program interface executed from the computer-readable medium by the processing unit, wherein the transformation process calls the application program interface to cause the processing unit to modify one or more elements in the intermediate representation, wherein the intermediate representation comprises a plurality of platform-neutral elements, wherein the plurality of platform-neutral elements comprise (a) one or more platform-neutral elements derived from a first code written for a first computer architecture, and (b) one or more platform-neutral elements derived from a second code written for a second computer architecture, wherein the first computer architecture is different from the second computer architecture.

15. The computerized system of claim 14, wherein the transformation process further calls the application program interface to cause the processing unit to navigate through the hierarchical intermediate representation to an element in the intermediate representation specified by the transformation process.

16. The computerized system of claim 14, wherein the transformation process further calls the application program interface to cause the processing unit to return information about an element in the intermediate representation specified by the transformation process.

17. The computerized system of claim 14, wherein the transformation process calls the application program interface to cause the processing unit to instrument the intermediate representation.

18. The computerized system of claim 17, wherein the transformation process specifies probe code to be inserted into the intermediate representation to instrument the intermediate representation.

19. The computerized system of claim 18, wherein the probe code includes a call to an external component specified by the transformation process.

20. The computerized system of claim 14, wherein the transformation process calls the application program interface to cause the processing unit to translate an element in the intermediate representation into a corresponding element for a specified computer architecture.

21. The computerized system of claim 20, wherein the transformation process calls the application program interface to cause the processing unit to set a flag in the intermediate representation that specifies the computer architecture.

22. A computer-readable medium having computer-executable instructions stored thereon to provide an interface to one or more elements within a hierarchy of an intermediate representation of a heterogeneous program comprising:
an instruction application interface exposed by an instruction element in the hierarchy for navigating, querying, modifying, and translating an instruction in the intermediate representation;
a block application interface exposed by a block element in the hierarchy for navigating, querying, and modifying a block in the intermediate representation;
a procedure application interface exposed by a procedure element in the hierarchy for navigating, querying, and modifying a procedure in the intermediate representation; and
a component application interface exposed by a component element in the hierarchy for navigating, querying, and modifying a component in the intermediate representation, wherein the intermediate representation comprises a plurality of platform-neutral elements, wherein the plurality of platform-neutral elements comprise: (a) one or more platform-neutral elements derived from a first code written for a first computer architecture, and (b) one or more platform-neutral elements derived from a second code written for a second computer architecture, wherein the first computer architecture is different from the second computer architecture.

23. The computer-readable medium of claim 22, further comprising:
a program application interface exposed by a program element in the hierarchy for modifying and querying the intermediate representation for the heterogeneous program.

24. A computerized method of interfacing a user process to an intermediate representation of a heterogeneous program with the intermediate representation arranged as a hierarchy of classes, the method comprising:
issuing, by the user process, an initial navigation call for a class within the hierarchy, wherein the initial navigation call specifies an absolute location within the hierarchy for an element in the class;
creating, by an interface process, an iterator for the class in response to receiving the initial navigation call;
returning, by the interface process, the element of the class located in the hierarchy at the absolute location, wherein the element is designated as a current element for the class;
issuing, by the user process, a modification call for the class, wherein the modification call specifies a change to the intermediate representation relative to the current element of the class; and
changing, by the interface process, the intermediate representation in response to receiving the modification call, wherein the intermediate representation comprises a plurality of platform-neutral elements, wherein the plurality of platform-neutral elements comprise (a) one or more platform-neutral elements derived from a first code written for a first computer architecture, and (b) one or more platform-neutral elements derived from a second code written for a second computer architecture, wherein the first computer architecture is different from the second computer architecture.

25. The method of claim 24, further comprising:

issuing, by the user process, a subsequent navigation call for the class, wherein the subsequent navigation call specifies a relative location within the hierarchy for an element in the class;

positioning, by the interface process, the iterator for the class at the relative location within the hierarchy in response to receiving the subsequent navigation call; and returning, by the interface process, an element of the class corresponding to the position of the iterator for the class, wherein the element returned is designated as a new current element for the class.

26. The method of claim 25, wherein the iterator is positioned relative to the current element of the class.

27. The method of claim 24, further comprising:

issuing, by the user process, a subsequent navigation call for the class, wherein the subsequent navigation call specifies a parent class for the class;

positioning, by the interface process, an iterator for the parent class at a location of an element of the parent class that is immediately above the current element in the class in the hierarchy in response to receiving the subsequent navigation call; and returning, by the interface process, the element of the parent class corresponding to the position of the iterator for the parent class.

28. The method of claim 24, further comprising:

issuing, by the user process, a subsequent navigation call for the class, wherein the subsequent navigation call specifies a child class for the class;

positioning, by the interface process, an iterator for the child class at a location of an element of the child class that is immediately below the current element in the class in the hierarchy in response to receiving the subsequent navigation call; and returning, by the interface process, the element of the child class corresponding to the position of the iterator for the child class.

29. The method of claim 24, further comprising:

issuing, by the user process, a query call for the class, wherein the query call specifies a characteristic of the class; and returning, by the interface process, information about the characteristic for the current element of the class in response to receiving the query call.

30. An application program interface embodied on a computer-readable medium for execution on a computer in conjunction with an intermediate representation of a heterogeneous program, the application program interface comprising:

a navigation function;

a query function; and a modification function;

wherein the navigation function is capable of returning a first element, a last element, a previous element, or a next element relative to a current element, within the intermediate representation, to a caller of the application program interface, wherein the intermediate representation comprises a plurality of platform-neutral elements, wherein the plurality of platform-neutral elements comprise (a) one or more platform-neutral elements derived from a first code written for a first computer architecture, and (b) one or more platform-neutral elements derived from a second code written for a second computer architecture, wherein the first computer architecture is different from the second computer architecture.

31. An application program interface embodied on a computer-readable medium for execution on a computer in conjunction with an intermediate representation of a heterogeneous program, the application program interface comprising:

a navigation function that returns an element in the intermediate representation to a caller of the application program interface;

a query function that returns information about the element in the intermediate representation returned by the navigation function to the caller;

a modification function that modifies the element in the intermediate representation as directed by the caller; and an output translation function that translates the element returned by the navigation function into a corresponding element for a specific computer architecture and returns the corresponding element to the caller, wherein the output translation function determines the specific computer architecture based on a flag set by the caller.

32. A computerized system comprising:

a processing unit;

a system memory coupled to the processing unit through a system bus;

a computer-readable medium coupled to the processing unit through a system bus;

an intermediate representation for a heterogeneous program in the system memory;

a transformation process executed by the processing unit; and an application program interface executed from the computer-readable medium by the processing unit, wherein the transformation process calls the application program interface to cause the processing unit to translate one or more elements in the intermediate representation into a corresponding one or more elements for a specified computer architecture, and wherein the transformation process calls the application program interface to cause the processing unit to set a flag in the intermediate representation that specifies the computer architecture.

* * * * *

UNITED STATES PATENT AND TRADEMARK OFFICE
CERTIFICATE OF CORRECTION

PATENT NO. : 6,662,356 B1
DATED : December 9, 2003
INVENTOR(S) : Edwards et al.

It is certified that error appears in the above-identified patent and that said Letters Patent is hereby corrected as shown below:

<u>Title page,</u>
Item [56], References Cited, OTHER PUBLICATIONS, "System for Buidling" should read -- System for Building --.

<u>Column 1,</u>
Line 9, "Ser. No. 09/343,248" should read -- Ser. No. 09/343,298 --.

<u>Column 22,</u>
Line 34, "comprise: (a)" should read -- comprise (a) --.

Signed and Sealed this

Twenty-ninth Day of June, 2004

JON W. DUDAS
*Acting Director of the United States Patent and Trademark Office*